United States Patent Office

2,793,111
Patented May 21, 1957

2,793,111

METHOD FOR THE RECOVERY OF COBALT FROM IMPURE COBALT OXIDE

Heinrich Schackmann, Ulrich Gregor, Carl Kayser, and Wilhelm Teworte, Duisburg, Germany, assignors to Duisburger Kupferhutte, Duisburg, Germany, a corporation of Germany No Drawing. Application December 20, 1954, Serial No. 476,538

Claims priority, application Germany December 21, 1953

10 Claims. (Cl. 75—82)

This invention relates to improvements in the recovery of cobalt from impure cobalt oxide.

In the treatment of cobalt-containing solutions it is customary to precipitate cobalt hydroxide from the solution, and thereafter calcine the hydroxide in a rotary furnace at a temperature of about 1200° C. The calcining produces an impure cobalt oxide, which contains, for example, up to about 40% Co, 10% Zn, 10% CaO, 12% MnO, and more than 1% each of S and Cl. This impure cobalt oxide is then reduced to cobalt metal in an electric furnace utilizing graphite electrodes at a temperature of about 1500–1600° C. with the use of lime, coke, and fluxes.

In the electric furnace the reduction and volatilization of the zinc impurities require a considerable additional input of electric energy, as well as the charging of a larger amount of coke, which contaminates the cobalt metal recovered. As a result of the presence of chlorine, cobalt losses are incurred and deleterious zinc chloride fumes are evolved. With the addition of lime, the removal of sulfur has to be effected by means of additional slag smelting, the duration of which is of great importance with regard to the consumption of energy, the efficiency and the wear of the furnace.

One object of this invention is to avoid the losses of cobalt and the above-mentioned disadvantages and difficulties in the recovery of cobalt metal from impure cobalt oxide. This, and still further objects, will become apparent from the following description:

In accordance with the invention, an impure cobalt compound containing zinc, sulfur and chlorine is subjected to a preliminary purification by contacting the same with a reduction gas at a temperature in excess of about 800° C. and preferably at a temperature of about 1000–1200° C. The upper limit of the temperature which may be used for the purification is the melting point of the metallic cobalt, i. e. about 1500° C.

The purification in accordance with the invention may be effective with impure cobalt compounds which contain as little as 2 parts of zinc and/or 2 parts of chlorine and/or 0.2 part of sulfur per 100 parts by weight of cobalt. While there is no upper limit on the amount of these impurities which the cobalt compounds may contain, for economic reasons it is not practical to treat a product which contains less than 5% cobalt.

The cobalt compounds which may be purified in accordance with the invention include, for example:

(a) Basic chlorides of cobalt, as precipitated from chloride-containing solutions of cobalt salt with alkalis, as, for example, lime, soda, soda lye and the like;

(b) Basic cobalt sulfates formed during the alkaline precipitation as in (a) from sulfate-containing solutions of cobalt salt;

(c) Basic chlorides of cobalt and basic cobalt sulfates in any ratio of mixture, formed during the alkaline precipitation as in (a), from solutions of cobalt salt, which, besides sulfates, contain chlorides;

(d) Cobalt compounds according to (a), (b), and (c), which, at the same time, contain zinc compounds, such as zinc hydroxide, basic zinc chloride, basic zinc sulfate, or mixtures thereof in any ratio of mixture. These products are obtained during the alkaline precipitation from solutions of cobalt salt according to (a), (b), and (c), containing zinc compounds;

(e) Cobalt hydroxide containing impurities in the form of basic zinc chlorides and/or basic zinc sulfates. A cobalt hydroxide such as this is formed during the basic precipitation from solutions of cobalt salt, which contain lesser amounts of the elements zinc, chlorine, and sulfur. The hydroxide containing varying amounts of impurities in the form of zinc, chlorine, and sulfur may also be obtained during the preliminary treatment of the products according to (a)–(d), in an aqueous solution;

(f) Cobalt oxide containing impurities in the form of zinc, chlorine or sulfur, or mixtures of the three substances. A product such as this is obtained, for example, during the thermal, non-reducing treatment of the products according to (a)–(e), at temperatures up to 1300° C.

The cobalt oxide obtained from the preliminary purification in accordance with the invention is practically free from zinc, sulfur and chlorine, and may be refined in the conventional manner without any of the previously encountered disadvantages.

The reduction gas used in accordance with the invention may be any conventional reduction gas containing carbon monoxide and hydrogen, as, for example, water gas, producer gas, blast furnace gas, and mixtures thereof.

The supply of heat for effecting and maintaining a temperature in excess of 800° C. in the presence of the endothermic reactions may be directly obtained by means of partial burning of the reaction gas, or may be indirectly obtained by means of combustion or electric energy.

If the heat supply is effected by directly burning the gas in the reaction furnace, gas may only be partially burnt so that a reducing atmosphere remains. If the process is carried out with indirect heating, as, for example, with electric energy, a reducing atmosphere must be obtained in the reaction furnace. Gases leaving the furnace must contain at least 3% by volume of $H_2$ or CO or mixtures thereof. If mixtures of CO and $H_2$ are used there is no limitation on the proportions of the two components.

Preferably the purification is effected by means of direct heating with fuel gases containing, in addition to the non-reducing gas constituents such as nitrogen, methane and carbon dioxide, about 5–40% by volume of CO and 5–50% by volume of $H_2$ as reducing agents. Gases of this composition are available, for example, in the form of blast furnace gas; water gas; coke oven gas; coal gas; hydrogen; oil gas; and producer gas.

While the individual parts by volume of CO and $H_2$ present in the gases are not essential to the purification process and each part may be placed by the other, it is important that the exit gas leaving the reaction furnace be maintained with a minimum content of 3% by volume of one of $H_2$, CO and mixtures thereof. Preferably the flue gas leaving contains 7–8% of one of CO, $H_2$ and mixtures thereof.

The purification in accordance with the invention is preferably effected in, for example, shaft furnaces, barrel-type furnaces, as well as in muffle furnaces.

The particle size of the cobalt oxide treated is not critical and the same may range from the size of fine sand particles, all the way up to the size of walnuts.

In accordance with a preferred embodiment of the invention, the calcining of the cobalt hydroxide to the cobalt oxide and the purification is effected in a single operation. In this case, the process is conveniently effected in a rotary furnace. The reducing treatment is so effected that the temperature at the outlet of the barrel of the rotary furnace is maintained at about 1150–1250° C. and the flue gases used in the furnace still have a small carbon oxide content upon leaving the barrel as, for example, a 7–8% carbon oxide content. In order to prevent a premature precipitation of, for example, the zinc and zinc oxide formed, a suitable gas current is passed through the barrel of the rotary furnace. The gas current should be sufficient to discharge the zinc vapor and zinc oxide formed from the gas furnace. Both of these substances have a sufficient vapor pressure at the reduction temperatures used, so that they will be removed with the vapor of the flue gas. As it is practically impossible to maintain an absolutely uniform temperature in the entire reaction apparatus, the danger of condensing the zinc and zinc oxide vapors exists. The suitable gas current will, however, prevent this precipitation. If direct heating by means of partial burning of the fuel gases in the reaction apparatus is used, the gas current formed thereby is sufficient without the necessity of any further measures. If, however, indirect heating is used, as, for example, with electric energy, a sufficient gas current must be passed through the apparatus. This gas current may be effected, for example, by cooling a part of the flue gases leaving for the condensation of the zinc vapor and zinc oxide vapor, respectively, and recycling this flue gas to the reaction furnace, thus increasing the amount of gas in circulation. In the treatment with the reducing gases in accordance with the invention, a certain quantity of cobalt is also reduced.

The calcining and purification may also be effected, of course, in separate apparatuses.

The purified cobalt oxide produced in accordance with the invention is excellently suited for subsequent treatment in an electric furnace for the recovery of metallic cobalt. The purification of the cobalt compounds in accordance with the invention produces a cobalt oxide containing only traces of impurities such as the zinc, sulfur and chlorine, and is considerably richer in cobalt. This cobalt oxide may be worked up in the electric furnace into metallic cobalt of commercial quality in a considerably shorter period of time using a considerably smaller amount of reduction coke and coal and of lime than was previously required.

Further, since the amount charged may be smaller, the melting period may be considerably reduced.

The preliminary purification of the zinc compounds effects the saving of time and energy previously required for the reduction and volatilization of zinc in the electric furnace.

The removal of the chlorine prevents the volatilization of metal chlorides and the metal losses resulting therefrom. Metallic chloride fumes are no longer formed, which cause trouble and attack the lining of the furnace.

The removal of sulfur eliminates or considerably shortens the troublesome refining operation previously required to remove the sulfur from the molten raw metal. The refinement is effected by means of basically reacting slags, such as lime. Normally, in accordance with the invention a special removal of sulfur from the melt obtained is only required if the amounts of coal or coke charged for the purpose of reducing the cobalt oxide have introduced sulfur into the melting process.

The advantages set forth above are so great that the production of a commercial cobalt metal from a refined cobalt oxide obtained in accordance with the invention may be effected in less than half the time required for the same treatment in connection with an oxide not subjected to the preliminary purification in accordance with the invention.

The following examples are given by way of illustration and not limitation:

*Example 1*

The calcining of a bivalent cobalt hydrate with a water content of 67%, containing in a dry state 27% Co, 16.7% Zn, 0.74% S, 15.5% Cl, 7.2% CaO, and 5.3% Mn, was effected in a rotary furnace with a mixture of blast-furnace gas and water gas in a proportion of, for example, 7–1. The supply of combustion air was so effected that a 7–8% excess of carbon oxide was still present in the flue gas. The calcining temperature at the outlet of the barrel amounted to about 1250° C. There was obtained a cobalt oxide with a composition of 60.6% Co and 0.6% Zn; there were only traces of S and $Cl_2$. The refining of the purified cobalt oxide to cobalt metal was effected in an electric furnace.

*Example 2*

Calcined cobalt oxide with 35.2% Co, 11.4% Zn, 4.4% S, and 1.5% Cl was heated to 1200° C. in an electric muffle, and water gas was passed through the material until the gas leaving ignited again. While the water gas was being passed through, the temperature of the material was maintained at 1200° C. The cobalt oxide obtained contained 49.6% Co and traces of Zn, S and Cl.

*Example 3*

Cobalt oxide with 45.4% Co, 12.5% Zn, 1.1% S and 0.9% Cl was heated to over 1100° C. in a shaft furnace with the aid of direct heating with a CO, $H_2$ containing fuel gas in the presence of air. The addition of air was so regulated that the temperature of the material was maintained at about 1000° C. while the reaction was taking place. There was obtained a cobalt oxide containing 61.0% Co, 0.15% Zn and only traces of S and $Cl_2$.

We claim:

1. Process for the purification of cobalt compounds containing impurities of the group consisting of zinc, sulfur and chlorine, which comprises heating such a cobalt compound in the presence of a reducing gas containing a member selected from the group consisting of carbon monoxide, hydrogen and mixtures thereof to a temperature between about 800 and 1500° C. said reducing gas containing not substantially in excess of 50% hydrogen and recovering the cobalt oxide formed substantially free from zinc, sulfur and chlorine.

2. Process according to claim 1, in which said heating is effected to a temperature between about 1000 and 1200° C.

3. Process according to claim 1, in which said cobalt compound is a member selected from the group consisting of basic chlorides of cobalt, basic sulfates of cobalt, cobalt hydroxide, cobalt oxide and mixtures thereof.

4. Process according to claim 1, in which said heating is effected by partially burning the reducing gas.

5. Process according to claim 1, in which said cobalt compound is cobalt oxide obtained by calcining cobalt hydroxide and in which said calcining and purification are effected simultaneously in a rotary furnace heated to a temperature of about 1150–1250° C. at its exit the flue gases used in said furnace still have a 7–8% content at their exit of a member selected from said group.

6. Process for the purification of cobalt oxide containing impurities of the group consisting of zinc, sulfur and chlorine which comprises heating said cobalt oxide in the presence of a reducing gas containing a member selected from the group consisting of carbon monoxide, hydrogen and mixtures thereof in a rotary furnace to a temperature between about 800° and 1500° C. at its exit, said cobalt oxide being obtained by simultaneously calcining cobalt hydroxide in said rotary furnace and in which said reducing gas is a flue gas from said rotary furnace and has a content of a member selected from the group consisting of carbon monoxide, hydrogen and mixtures thereof of at least 3% by volume at the furnace exit and recovering the cobalt oxide formed substantially free from zinc, sulfur and chlorine.

7. Process according to claim 6, in which said flue gases have a content of 7-8% by volume of said group member at the furnace exit.

8. Process according to claim 7, which includes reducing the cobalt oxide recovered in an electric furnace and recovering the metallic cobalt produced.

9. Process according to claim 1, which includes reducing the recovered cobalt oxide in an electric furnace and recovering the metallic cobalt produced.

10. Process according to claim 1 which includes the recovery of metallic cobalt from said cobalt oxide in an electric furnace.

References Cited in the file of this patent
UNITED STATES PATENTS 2,481,226    Krebs _____ Sept. 6, 1949

OTHER REFERENCES

Mellor: Comprehensive Treatise on Inorganic and Theoretical Chemistry, vol. 14, pages 447, 448, 1935.